UNITED STATES PATENT OFFICE.

ERNST TÄUBER, OF BERLIN, GERMANY, ASSIGNOR TO THE FARBWERKE, VORMALS MEISTER, LUCIUS & BRÜNING, OF HÖCHST-ON-THE-MAIN, GERMANY.

PROCESS OF MAKING AMIDINS.

SPECIFICATION forming part of Letters Patent No. 596,797, dated January 4, 1898.

Application filed March 6, 1897. Serial No. 626,335. (Specimens.) Patented in Germany March 16, 1894, No. 79,868, and July 20, 1894, No. 80,568.

*To all whom it may concern:*

Be it known that I, ERNST TÄUBER, doctor of philosophy, a citizen of the Empire of Germany, residing at Berlin, in the Empire of Germany, have invented certain new and useful Improvements in the Manufacture of Amidins of Amidophenol Ethers, (for which Letters Patent were granted to me in Germany, No. 79,868, dated March 16, 1894, and No. 80,568, dated July 20, 1894,) of which the following is a specification.

This invention relates to the manufacture of amidins of amidophenol ethers, which are to be used like cocaine as medical preparations for producing local insensibility.

I have found that the amidins of amidophenol ethers having the general formula

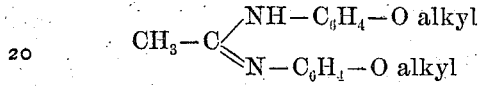

may be obtained by combining acetyl derivatives of amidophenol ethers with the amidophenol ethers themselves by means of a dehydrating agent—such as halogen compounds of phosphorus, sulfid of phosphorus, hydrochloric acid, and heat.

My improved process is carried out in the following manner:

*Example 1. Ethenylparaethoxyparaethoxydiphenylamidin.*—Eighteen parts, by weight, of finely-powdered phenacetin are covered with thirty parts, by weight, of benzene, and while being well cooled 70.5 parts of phosphorus pentachlorid (or 15.3 parts of phosphorus oxychlorid or fourteen parts of phosphorus trichlorid) are added. Then 13.9 parts of paraphenetidin, dissolved in twenty parts of benzene, are added immediately while cooling, and the mass is well mixed up. The reaction is completed by heating for several hours. The benzene is distilled off. The resinous light-yellow residue is dissolved in water and the ethenyl base precipitated from the solution with ammonia. It is obtained pure by crystallization from diluted alcohol.

*Example 2. Ethenylorthoethoxyparaethoxydiphenylamidin.*—Equal parts, by weight, of phenacetin and orthophenetidin hydrochlorid are pulverized together and the mixture heated for fifteen hours in an oil-bath to 180° centigrade. The product, which is dark colored and becomes liquid by heating, is boiled with twenty volumes of water. The solution is allowed to cool, then filtered from a little resinous matter and some unchanged phenacetin, and the new base is precipitated with alkali. The purification of the crude base is effected as before.

The amidins produced by the before-mentioned processes are basic compounds, combining with acids, and can be crystallized from dilute alcohol and a mixture of benzene and ligroin. They are sparingly soluble in water and ligroin, easily soluble in ether, alcohol, and benzene, melting between 75° and 131° centigrade. The hydrochlorids of amidins are more or less easily soluble in water.

The new amidins are used for medical purposes, for which they are of great value, producing local insensibility like cocaine and being applied in a similar manner.

The following table shows the properties of my new amidins:

| Name. | Melting-point. | Appearance. | Solubility. | Hydrochlorid. |
|---|---|---|---|---|
| Ethenylparaparadiethoxydiphenylamidin | 121° | | Easily soluble in alcohol, benzene, ether; difficultly soluble in ligroin and water. | Soluble in water. |
| Ethenylorthoörthodimethoxydiphenylamidin | 99° | Forming white needles. | | |
| Ethenylorthomethoxyparamethoxydiphenylamidin | 108° | do | | |
| Ethenylparaparadimethoxydiphenylamidin | 105° | do | | |
| Ethenylorthomethoxyparaethoxydiphenylamidin | 107° | | | |
| Ethenylparamethoxyparaethoxydiphenylamidin | 98° | | | |
| Ethenylorthoethoxyparaethoxydiphenylamidin | 75° | | | |

Having thus described my invention, what I claim is—

1. The process herein described of producing the amidins of amidophenol ethers, which consists in heating the acetyl compounds of amidophenol ethers with amidophenol ethers themselves and a dehydrating agent, such as a halogen compound of phosphorus, sulfid of phosphorus and hydrochloric acid, substantially as set forth.

2. As a new medicinal product, the amidins of amidophenol ethers, having the general formula

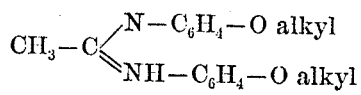

and being either in the form of their salts, such as hydrochlorates or as free bases, the latter crystallizing in white needles, melting between 75° and 120° centigrade, being difficultly soluble in water and ligroin, but easily soluble in alcohol, ether and benzene, substantially as set forth.

In testimony that I claim the foregoing as my invention I have signed my name in presence of two subscribing witnesses.

ERNST TAUBER.

Witnesses:
 CURTIS C. HOWARD,
 LUDWIG LIMPACH.